3,507,645
SEPARATION PROCESS
Ernst L. T. M. Spitzer, Amsterdam, Netherlands, and Alun Gabriel, Coulsdon, England, assignors to Shell Oil Company, New York, N.Y., a corporation of Delaware
No Drawing. Filed Feb. 23, 1968, Ser. No. 707,473
Claims priority, application Great Britain, Feb. 27, 1967, 9,127/67
Int. Cl. C22b 15/00, 23/00
U.S. Cl. 75—101                                   3 Claims

ABSTRACT OF THE DISCLOSURE

Nickel and copper values are selectively removed from aqueous solutions also containing iron and copper values by the process of (1) selectively extracting from the aqueous solution a major proportion of the iron values and a substantial proportion of the copper values employing a dialkyl methyl sulfonium salt as extraction agent, (2) selectively extracting essentially all the remaining iron and copper values from the initial aqueous raffinate employing certain mixed secondary and tertiary carboxylic acids at controlled pH, and (3) recovering the cobalt and nickel values from the resulting second aqueous raffinate.

BACKGROUND OF THE INVENTION

The extraction of metal values, that is, non-alkali metal salts or metal ions derived therefrom, from aqueous solutions of the metal salts is employed in numerous industrial processes, for example, in order to isolate or at least concentrate the desired metal values from dilute aqueous solution. In an alternate procedure, metal values are purified by selectively removing undesirable metal compounds from the aqueous solution. The selective extraction of one metal value from another is of particular importance in the metallurgical industry where the starting materials are usually aqueous solutions of a number of metal values obtained by leaching of ores with aqueous solutions of acids, bases or metal salts after the ores have been brought into a suitable form by crushing, grinding, screening and the like. The metal values thus separated are typically subjected to further treatments such as precipitation, electrolysis and/or pyrometallurgical processes.

SUMMARY OF THE INVENTION

It has now been found that nickel and cobalt values are separated from even relatively large proportions of iron and copper values by the several-stage process which comprises (1) intimately initially contacting an aqueous feed containing the nickel and cobalt values as well as iron and copper values with a solution of certain dialkyl methyl sulfonium salts in a solvent substantially immiscible with the aqueous phase, (2) intimately contacting the resulting separated initial aqueous raffinate with a solution of mixed secondary and tertiary carboxylic acids in a solvent substantially immiscible with the aqueous phase at controlled pH to effect removal of essentially all the remaining copper and iron values, and (3) recovering the nickel and cobalt values from the resulting second aqueous raffinate.

DESCRIPTION OF PREFERRED EMBODIMENTS

Broadly speaking, the separation process of the present invention comprises a process for selectively recovering metal values from an aqueous medium by liquid-liquid extraction wherein, in a first separation, an aqueous acidic medium containing metal values is contacted with a cationic extraction agent to extract at least one of the metal values, whereupon the two phases are separated and the initial aqueous raffinate is contacted with an anionic extraction agent to remove a major proportion of at least one additional metal value from the aqueous phase, with one or more metal values being subsequently removed from the remaining raffinate phase. More particularly, the process comprises removal of a major proportion of the iron values and a substantial proportion of the copper values from an aqueous solution also containing cobalt and nickel values by initially intimately contacting the aqueous feed, having been rendered acidic and enriched in halide ions, with a solution of a dialkyl methyl sulfonium salt in a solvent which is substantially immiscible with the aqueous feed. The resulting phases are separated and the initial aqueous raffinate thus produced is contacted at controlled pH with a solution of certain mixed secondary and tertiary carboxylic acids in a solvent which is substantially immiscible with the aqueous phase, thereby removing essentially all the remaining iron values and copper values in the organic extract upon phase separation. The remaining aqueous raffinate, a second aqueous raffinate, contains the purified nickel and cobalt values, from which raffinate the values are recovered.

The initial extraction.—The initial extraction comprises the intimate contacting of the aqueous feed containing metal values with a solution of a dialkyl methyl sulfonium salt in a solvent which is substantially immiscible with the aqueous feed.

The dialkyl methyl sulfonium salt employed as the initial extraction agent is a dialkyl methyl sulfonium salt wherein each alkyl is alkyl of from 4 to 12 carbon atoms, preferably from 7 to 12 carbon atoms, Although other types of sulfonium salts are useful, e.g., sulfates, methosulfates and the like, the preferred sulfonium salt anion is halide, particularly chloride or bromide. Illustrative of such sulfonium salts are di-n-octyl methyl sulfonium chloride, dibutyl methyl sulfonium chloride, dihexyl methyl sulfonium chloride, didodecyl methyl sulfonium chloride and hexyl decyl methyl sulfonium bromide.

The sulfonium salt is employed in solution in an organic solvent which is substantially immiscible, if miscible at all, with the aqueous feed containing the metal values. In general, normally liquid organic solvents which are non-reactive and substantially immiscible with the aqueous feed are suitable. Preferred organic solvents are the halogenated lower alkanes, e.g., chloroform, methylene chloride, dichloroethane, dichloropropane and the like. The concentration of the sulfonium salt in the organic solvent is not critical and concentrations from about 0.1 mole per liter to about 2 moles per liter of sulfonium salt in the total organic solution are satisfactory.

In order to obtain an optimum separation of metal values, the aqueous feed should be acidic and should contain an excess of halide ions. The acidity of the aqueous solution should be such that an excess of hydrogen ions of from about 0.3 gram-equivalent per liter to about 1 gram-equivalent per liter is present. In other terms, the pH of the aqueous solution should be from about 0 to about 0.5. The excess halide ion, which is preferably chloride ion, is present in amounts from about 1 gram-equivalent per liter to about 5 gram-equivalents per liter, preferably from about 2 to about 4. The halide ions and the desired acidity are provided in any convenient form. In one modification, the aqueous feed is made acidic with a halide-free mineral acid, e.g., sulfuric acid, and halide ion is provided as a water-soluble alkali metal salt such as sodium chloride or potassium chloride. In an alternate modification, the excess hydrogen ion is provided in the form of a hydrohalic acid, e.g., hydrochloric acid, with the remainder of the halide ion provided as the alkali metal halide.

The extraction process is conducted by contacting the solution of sulfonium salt and the acidic, aqueous feed, and relative proportions of which are not critical, in a batch-type or in a continuous process. In the latter modification, a several-stage continuous countercurrent extraction is preferred. In any modification, sufficient agitation is provided, as by vigorous stirring, to insure adequate phase contact. The extraction is conducted at any convenient temperature and pressure so long as the various solvent media remain in the liquid phase. The utilization of ambient temperature and pressure is satisfactory and is preferred as a matter of convenience.

The separation of the phases by conventional procedures affords an organic extract containing a major proportion of the iron values and a substantial part of the copper values originally present in the aqueous feed. The aqueous raffinate, herein termed the initial aqueous raffinate, contains copper values and a small residue of iron values in addition to nickel and cobalt values, the concentrations of which are not appreciably affected by the extraction with the sulfonium salt.

If desired, the metal values of the organic extract are removed as by treatment with water or dilute aqueous acid and the organic phase thus produced which contains the sulfonium salt extraction agent is suitably recycled.

The second extraction.—The initial aqueous raffinate is subsequently contacted with a solution of certain secondary and tertiary carboxylic acids at controlled pH in a solvent substantially immiscible with the aqueous phase in order to effect the removal of essentially all the remaining iron and copper values, i.e., the essential remainder of these values.

The acid mixture employed as extraction agent comprises a mixture of secondary and tertiary aliphatic carboxylic acids of from 7 to 15 carbons per molecule. These acids, herein termed "mixed secondary and tertiary acids," are produced by reaction of hydrocarbon olefins with carbon monoxide and water in the presence of a highly acidic catalyst such as sulfuric acid, phosphoric acid, hydrofluoric acid, boron trifluoride or mixtures thereof. The resulting product is essentially devoid of primary carboxylic acids and consists of secondary or tertiary carboxylic acids, that is, acids of from two to three alkyl substituents on the carbon atom alpha to the carboxyl group, depending upon the nature of the olefin feed. For example, from a highly branched nonene feed, a mixture of some secondary but predominantly tertiary decanoic acids is produced. Other illustrative olefin feeds include 1-octene, diisobutylene, 1-dodecene and propylene tetramer as well as mixtures of olefins such as are obtained by cracking of paraffin waxes or petroleum fractions. A particularly useful acid mixture comprises a mixture of acids of 9 to 11 carbon atoms, predominantly 10 carbon atoms, obtained by reaction of propylene trimer with carbon monoxide and water under acid conditions. A further description of methods of producing the mixed secondary and tertiary acids is provided by British Patent Nos. 743,597 and 798,065.

The carboxylic acid mixture which is employed as extraction agent in the second extraction is utilized in solution in a solvent which is substantially immiscible, if miscible at all, with the aqueous phase. Suitable solvents include halogenated hydrocarbons, e.g., chloroform, 1,2-dichloroethane, chlorobenzene and methylene bromide, and hydrocarbons, either aliphatic or aromatic including dodecane, cyclohexane, decahydronaphthalene and benzene, or mixtures of hydrocarbons such as kerosene and other petroleum fractions.

In conducting the second extraction, i.e., that which employs the carboxylic acid mixture as extraction agent, the aqueous phase should have a pH somewhat higher than that of the initial aqueous affinate. Suitable separation of the essential remainder of iron and copper values from the nickel and cobalt values is accomplished at a pH value of at least 3, preferably of at least 5 and best results are obtained when the pH is in the range from about 5.0 to about 5.5. Neutralization of the initial aqueous raffinate is effected by the addition prior to or during contact with the solution of extraction agent of a basic material, preferably provided as the alkali metal or ammonium hydroxide or carbonate.

The extraction is conducted by conventional liquid-liquid extraction procedures, such as are described hereinabove with reference to the initial extraction. In one modification the organic phase containing the extracting agent is contacted with the previously neutralized initial aqueous raffinate. In another modification, the organic and aqueous phases are contacted and the basic material is added to effect extraction and neutralization simultaneously. Moreover, when the extraction is conducted in a several-stage process, the pH is maintained at the same desired value during each stage, or alternatively the pH is varied, typically increased, during progression through two or more stages, so long as at least one stage of the extraction takes place when the pH of the aqueous phase is within the desired limits. By any procedure, the carboxylic acid mixture serves to remove essentially all the remaining iron and copper values from the aqueous phase so that the remaining aqueous raffinate, herein termed a second aqueous raffinate, is essentially devoid of copper and iron values, thereby providing a solution purified with respect to the nickel and cobalt values contained therein.

The second organic extract is conveniently treated with aqueous acid, e.g., dilute hydrochloric acid, to liberate the extracted metal values and provide an organic phase containing the secondary and tertiary carboxylic acids which is suitable for recycle.

The purified nickel and cobalt values are removed from the second aqueous raffinate by conventional procedures as by precipitation, solvent removal and the like, or are further treated before or subsequent to removal from the second aqueous raffinate to effect separation of one metal value from the other.

The process of the invention is of special utility for the recovery of metal values from solutions obtained by the acid leaching of ores, particularly those solutions having from about 10 grams per liter to about 30 grams per liter each of iron values and of copper values and from about 3 grams per liter to about 20 grams per liter each of nickel values and of cobalt values.

To further illustrate the improved process of the invention, the following examples are provided. It should be understood that the details thereof are not to be regarded as limitations as they may be varied as will be understood by one skilled in this art.

Example I

One mole of $C_{10}$-olefins, 2 moles of hydrogen sulfide, and 3.36 moles of ammonia were heated in a rotating autoclave at 140° C. for 18 hours. The olefins used were a fraction boiling at 163–184° C. at atmospheric pressure that had been obtained by cracking paraffinic hydrocarbons, extracted from paraffin wax with the aid of urea. After filtration to remove the ammonium sulfide formed, the filtrate was distilled at 20 mm. Hg until the bottom temperature had reached 240° C., the stillhead temperature then being 175° C.

One mole of the crude di-sec-$C_{10}$-alkyl sulfide thus obtained as the bottom product was subsequently methylated by stirring with 1 mole of dimethyl sulfate at 80° C. for five hours. The product was then taken up in 30% aqueous ethanol, and the unconverted organic material extracted with pentane. The alcohol was finally distilled off, and the remaining aqueous solution of di-sec-$C_{10}$-alkyl-sulfonium methylsulfate was treated with a threefold excess of hydrochloric acid, whereupon the resulting sulfonium chloride was extracted with chloroform.

Example II

A propylene trimer fraction boiling between 124° and 148° C. with the midpoint at 139° C. was obtained by passing a propene-propane mixture over solid phosphoric acid at a temperature of 240° C. and a pressure of 25 atm., followed by distillation of the product to remove a propylene tetramer fraction, and subsequent fractionation of the lower boiling polymers to separate a fraction having an average of 8 to 10 carbon atoms and predominating in polymers having 9 carbon atoms per molecule.

The propylene trimer fraction was caused to react with carbon monoxide in the presence of phosphoric acid/ boron trifluoride catalyst, molar ratio 1:1.5, with a water content of 15% wt., under the following conditions: 100 atm. gauge CO-pressure; 1.5 hours residence time; 2:1 (v./v.) catalyst/olefin ratio; 60° C. temperature.

After settling of the phases at 50° C., the catalyst was recovered by a 3-stage countercurrent wash with makeup water and the reaction product was then purified by washing with 3% w. concentrated $H_2SO_4$ (98%) at 60° C. The excess acid was neutralized with dilute NaOH to a pH of about 5. Subsequently, the organic layer was treated with 20% v. of an aqueous solution of sodium citrate (5% wt.) and $NaHCO_3$ (5% wt.), and finally washed with 50% vol. of water.

The crude acids thus obtained were then fractionated at a temperature from 257° to 275° C., about 7.3% wt. being removed as light ends and 10.8% wt. as heavy ends. The acid mixture thus prepared contained 82–87% of $C_{10}$-acids.

Example III

The following runs were conducted in a specially designed separatory funnel which consisted of a graduated straight-walled vessel of one liter capacity. The funnel could be drained through a stopcock at the bottom. The top opening was used to introduce the double-paddle stirrer, and it also served as the inlet for the feed. The extractions were carried out by contacting 100 ml. of the aqueous solution containing the metal values with 200 ml. of the organic extracting solution, and stirring at a rate of about 2000 r.p.m.

The aqueous feed was a solution containing 18.6 g. $Fe^{3+}$, 25.4 g. $Cu^{2+}$, 15 g. $Co^{2+}$ and 5 g. $Ni^{2+}$, and, in addition, 15 g. $H_2SO_4$ per liter. Common salt was added to supply an amount of 3 moles sodium chloride per liter. The solution was then contacted with a 0.4 M solution of the sulfonium chloride in chloroform, the volume ratio of organic phase/aqueous phase being 2:1. After vigorous stirring at room temperature for one minute, the phases were separated, and the aqueous phase was extracted with a fresh portion of the extracting agent in the same manner as before, whereupon a third extraction of the raffinate was carried out in a similar way.

The extracting agent was subsequently regenerated by backwashing with water, the metal values being estimated in the aqueous phase obtained in each case. The total amounts of metal values extracted are shown in the table below, where the cumulative amounts obtained in three successive extractions are listed as percent by weight of the respective metal values originally present.

The aqueous raffinate obtained after extraction with the sulfonium chloride, as described above, was contacted with an equal volume of a 1 M solution of the acid mixture of Example II in kerosene. Subsequently, with vigorous stirring at room temperature, a concentrated ammonium hydroxide solution was gradually added, the pH being increased to 3.6. Stirring was discontinued and the phase allowed to separate.

The raffinate phase was then removed and contacted with a fresh portion of the extracting agent in the same manner as before, with stirring at room temperature, while the pH was gradually increased to 5.2 by addition of the concentrated ammonium hydroxide solution. After settling, the extract phase was separated in the same way as described above.

From the extract phases thus obtained, the metal values were recovered by back-washing with 2 N sulfuric acid and estimated in the aqueous phases obtained. In the table below are listed in cumulative order the additional amounts of metal values extracted at pH 3.6 and pH 5.2, respectively, as percent by weight of the respective metal values originally present.

TABLE

Aqueous feed: 18.6 g.$Fe^{3+}$, 25.4 g.$Cu^{2+}$, 15 g.$Co^{2+}$, 5 g.$Ni^{2+}$, 15 g.$H_2SO_4$ and 3 moles NaCl per liter

| | $Fe^{3+}$ | $Cu^{2+}$ | $Co^{2+}$ | $Ni^{2+}$ |
|---|---|---|---|---|
| Extracted metal, percent wt.: | | | | |
| Extraction with a 0.4 M solution of di-sec-$C_{10}$-alkylmethylsulfonium chloride in chloroform: | | | | |
| After 1 step | 67.6 | 12.6 | 0.7 | 0.0 |
| After 2 steps | 88.9 | 25.2 | 1.7 | 0.0 |
| After 3 steps | 96.2 | 36.2 | 2.3 | 0.0 |
| Extraction with a 1 M solution of mixed acids: | | | | |
| With 3.6 pH after extraction | 2.7 | 45.0 | 1.0 | 0.4 |
| With 5.2 pH after extraction | 2.9 | 63.8 | 15.4 | 19.6 |
| Metal values, percent wt.: | | | | |
| Total extracted | 99.1 | 100.0 | 17.7 | 19.6 |
| In raffinate | 2.4 | 0.3 | 83.6 | 80.5 |
| Recovery | 101.5 | 100.3 | 101.3 | 100.1 |

We claim as our invention:

1. The process of recovering nickel and cobalt values from an aqueous solution also containing iron and copper values which comprises
   (1) intimately contacting said solution of a pH from about 0 to about 0.5 and a halide ion concentration of from about 1 gram-equivalent per liter to about 5 gram-equivalents per liter with a solution of a dialkyl methyl sulfonium halide, wherein each alkyl independently is alkyl of from 4 to 12 carbon atoms, in an organic solvent substantially immiscible with the aqueous phase, thereby separating a major proportion of the iron values and a substantial proportion of the copper values of said aqueous solution in the resulting initial organic extract from the resulting initial aqueous raffinate,
   (2) intimately contacting the initial aqueous raffinate neutralized to a pH of at least 3 with a solution of mixed secondary and tertiary aliphatic carboxylic acids of from 7 to 15 carbon atoms per molcule in organic solvent substantially immiscible with the aqueous phase, thereby separating essentially all the remaining iron and copper values of the aqueous phase in the resulting second organic extract from the resulting second aqueous raffinate, and
   (3) recovering from the second aqueous raffinate said nickel and cobalt values.

2. The process of claim 1 wherein the pH of the neutralized initial raffinate is at least 5.

3. The process of claim 1 wherein the initial concentration of the iron values and of the copper values is each from about 10 grams per liter to about 30 grams per liter and the initial concentration of the nickel values and of the cobalt values in each from about 3 grams per liter to about 20 grams per liter.

References Cited

UNITED STATES PATENTS 3,251,646  5/1966  Alon et al. _____ 23—50
3,369,876  2/1968  Grimm _____ 75—117

L. DEWAYNE RUTLEDGE, Primary Examiner

T. R. FRYE, Assistant Examiner

U.S. Cl. X.R.

23—50; 75—119